United States Patent
Hedgcock et al.

(10) Patent No.: US 6,182,060 B1
(45) Date of Patent: Jan. 30, 2001

(54) METHOD AND APPARATUS FOR STORING, RETRIEVING, AND PROCESSING MULTI-DIMENSIONAL CUSTOMER-ORIENTED DATA SETS

(76) Inventors: Robert Hedgcock, 1035 E. Roberta Ave., Waukesha, WI (US) 53188; Timothy J. Keane, 2540 Winfield La., Brookfield, WI (US) 53045; Jeffrey F. Naughton, 7506 Red Fox Trail, Madison, WI (US) 53717

( * ) Notice: Under 35 U.S.C. 154(b), the term of this patent shall be extended for 0 days.

(21) Appl. No.: 09/057,001

(22) Filed: Apr. 8, 1998

Related U.S. Application Data (60) Provisional application No. 60/043,597, filed on Apr. 15, 1997.

(51) Int. Cl.$^7$ .................................................. G06F 17/30
(52) U.S. Cl. ................. 707/1; 707/7; 707/503; 707/902; 705/75; 705/1
(58) Field of Search ................. 707/1, 7, 503; 707/962; 705/75, 5, 1

(56) References Cited

U.S. PATENT DOCUMENTS

| | | | |
|---|---|---|---|
| 5,359,724 | 10/1994 | Earle | 707/205 |
| 5,799,300 * | 8/1998 | Agrawal et al. | 707/5 |
| 5,864,857 * | 1/1999 | Ohata et al. | 707/100 |
| 5,940,818 * | 8/1999 | Malloy et al. | 707/2 |
| 5,943,668 * | 8/1999 | Malloy et al. | 707/3 |
| 5,970,476 * | 10/1999 | Fahey | 705/28 |

* cited by examiner

Primary Examiner—Thomas G. Black
Assistant Examiner—William Trinh
(74) Attorney, Agent, or Firm—Godfrey & Kahn, S.C.

(57) ABSTRACT

Method and apparatus for storing, retrieving, and processing customer-oriented data sets in which relatively large sets of customers and their transactions or the like may be quickly and efficiently analyzed. A multi-dimensional access structure is utilized in which each cell representing one dimension element or a combination of dimension elements may include a list of customers who have made purchases or other transactions associated with that cell. Each customer record in a list may summarize predetermined information pertaining to that customer's behavior in the cell. Such records may be sorted by customer number to enable efficient combining of multiple lists. In applications wherein the number of such cells is prohibitively large, only a portion of these cells may actually include materialized lists. Additionally, a user-specified subset of the cells may be efficiently populated from input data, and lists which are not materialized may be materialized on demand from other lists in an efficient manner.

30 Claims, 4 Drawing Sheets

METHOD AND APPARATUS FOR STORING, RETRIEVING, AND PROCESSING MULTI-DIMENSIONAL CUSTOMER-ORIENTED DATA SETS

CROSS REFERENCE TO RELATED APPLICATION

This application is based upon a provisional application Ser. No. 60/043,597, filed Apr. 15, 1997.

BACKGROUND OF THE INVENTION

The present invention relates to a method and apparatus for storing, retrieving, and processing customer behavior data, account information and the like from a multi-dimensional viewpoint.

Two types of systems for handling data representative of customers, accounts or the like may be utilized, that is, On-Line Analytic Processing ("OLAP") systems (both proprietary and relational database versions) and systems specifically designed for database marketing.

OLAP systems can be viewed as an extension of a spreadsheet paradigm in which a spreadsheet is a two-dimensional view of a data set. For example, product identification (ID) may be arranged on one axis, time on the other axis, and sales as the entry in the data cells. Multi-dimensional database systems may generalize such arrangement to allow more than two dimensions. For instance, in the previous example, in addition to product ID and time, geographical location may also be arranged as a third dimension.

There are a number of products which may present users with a multi-dimensional view of their data. Such products may fall into two groups or systems: those that actually store the data using multi-dimensional data structures (arrays and generalizations of arrays) and those that store the data in a relational database system. The former class of system may be referred to as "MOLAP" (for Multi-Dimensional OLAP), while the latter may be referred to as "ROLAP" (for Relational OLAP). Both systems may answer queries about the contents of cells in a logical multi-dimensional space, which is similar to asking for the contents of a given cell in a spreadsheet. Additionally, they may enable questions to be addressed regarding columns and rows by mathematical computation of columns and rows. For example, it may be desirous to obtain sales by product over all time periods, or sales of all products on a particular date. Further, in both systems, each cell may store a single number or a small set of numbers.

In these systems, the use of "hierarchies" for dimensions may be employed. As an example, consider the "time" dimension. In such dimension, days may be the lowest level in the hierarchy, followed by weeks as the second level of the hierarchy, followed by months as the third hierarchial level, and a fiscal year as the highest hierarchical level of the time dimension. As another example, consider geography. Here, stores may form the first hierarchical level, followed by districts, regions, and countries. Such use of hierarchies for dimensions may facilitate the ease of use of the system, as the data is organized in a logical, user-oriented manner. Additionally, such hierarchies may provide structural information to the system itself that can be used to answer queries efficiently. For example, if the sales of a given product by month are known, the sales of the product for a given year may be computed by summing the sales over the corresponding 12 months. Without the use of hierarchical information, it would be necessary to revert to the lowest level of detailed data to compute the sales for a year which, as is to be appreciated, may be considerably slower.

While the use of OLAP systems may be acceptable for certain types of applications (as, for example, in analyzing the financial performance of a business), they may not be acceptable for use with other applications such as those involving customer-oriented data sets. For example, in customer-oriented data sets, information pertaining to individual customers should be retained. If such individual customer information is omitted, it may be very difficult, if not impossible, to analyze the data set at a unit of individual customers. As a result, database marketing and other applications may not be effectively performed or may even be impossible to perform. To store individual customer information in current systems normally requires that "customer" is one of the dimensions. However, as is to be appreciated, for any reasonably sized data set, such "customer" dimension may be extremely large.

Multi-dimensional database systems typically assume that dimension sizes will be reasonable. As such, "extremely large" dimensions may present a serous problem. More specifically, in current multi-dimensional database systems, a dimension size of several tens or hundreds of elements may be typical, and a dimension with 10,000 elements may be considered very large. By contrast, the customer dimension of a medium sized retailer or financial institution can easily reach 10,000,000 or more elements. If one uses a multi-dimensional database system on such a data set, several problems may arise. First, since the techniques used for good performance in these multi-dimensional systems (heavy pre-summarization and sophisticated indexing) are not effective, the performance may degrade such that interactive use is very difficult or impossible. Second, the query paradigm may not fit with the analyst's goals. This mismatch arises because a standard way of displaying a multi-dimensional query result (a table or graph) may be of limited value when one of the axes has a million or more elements.

Due to the above-described limitations, current multi-dimensional database systems may handle customer-oriented data sets having a relatively large customer dimension in one of two techniques. In a first technique, individual customer information may be omitted, whereupon, such system is really a merchandise sales analysis tool rather than a customer analysis tool. In a second technique, the large number of customers (which may be 10,000,000+ customers) is statically segmented or arranged into a small number of groups, and all future analysis is based on those segments rather than on the individual customers comprising the segments. Thus, both of these techniques may lose or obliterate individual customer information which is a substantial portion of the economically critical information that true customer-centered data sets may contain. For this reason, a typical multi-dimensional database tool may not be effectively utilized for customer-oriented data processing.

Relational database systems, on the other hand, may store and process relatively large data sets. However, the models embodied in relational database systems are typically very simple and generic. For instance, all data may be represented in two-dimensional tables. Further, such models may be insufficient for many business intelligence applications. At best, a relational model of a relational database system may be used as a lower-level substrate upon which to build more sophisticated and useful model. (Relational multi-dimensional data analysis tools are examples.)

Therefore, neither relational database systems nor multi-dimensional OLAP tools may be effectively used for customer-oriented data analysis. In an attempt to handle such analysis, a special purpose system tailored explicitly to process a large list of records may be used. Such system may be used in database marketing applications. There is no multi-dimensional paradigm in these systems; typically the data is represented in a very primitive structure, usually a so-called flat-file or a flat file and a collection of so-called inverted files based upon that flat file. (A "flat-file" is a file of records without any extra structure imposed thereon. That is, a flat file may have no index structures to speed access to records within the file. On the other hand, an inverted file is an auxiliary file based off of a main file but sorted on another attribute. For example, consider a situation wherein a base file has customer ID, store ID, and purchase amount which are sorted in order of increasing customer ID number. In such situation, an associated inverted file may be defined and populated that again has customer ID, store ID, and purchase amount, but which are sorted by store ID. This inverted file may facilitate queries such as "find all purchases in store 27", since the records for purchases in store 27 will be co-located in the inverted file.)

Unlike multi-dimensional database systems, the above-mentioned special system may somewhat enable operations involving large detailed lists of customer behavior. However, these systems also have a number of serious defects or disadvantages.

One disadvantage is that, unlike multi-dimensional database systems, the model embodied by these special purpose or "list processing" systems may not be rich or complete enough to allow a large class of optimizations that improve performance, nor may it not be rich enough to facilitate a structured analysis of a data set. As such, a collection of ad-hoc queries and result sets may be provided, with no clear relationship among them, no opportunities for system-based optimal re-use of information, and no opportunities for judicious pre-computation as a run-time query accelerator. That is, in most if not all decision support applications, query-time performance may be improved by computing answers to common queries or sub-parts of sub-queries in advance or ahead of time. However, determining which pre-computed results may be used to assist in answering which queries may be difficult unless a formal structure to the system is provided which facilitates such process.

Another disadvantage is that these models or tools may not provide a multi-dimensional view of data and/or may not be integratable or usable with multi-dimensional data analysis tools which are becoming the choice for business data set analysis.

OBJECTS AND SUMMARY OF THE INVENTION

An object of the present invention is to provide a system which eliminates the above-described deficiencies of the current OLAP and database marketing tools.

More specifically, it is an object of the present invention to provide a system which combines the multi-dimensional data analysis and interactive speed of an OLAP tool with the detailed customer list handling capabilities of a customer information system.

Other objects, features and advantages according to the present invention will become apparent from the following detailed description of illustrated embodiments when read in connection with the accompanying drawings in which corresponding components are identified by the same reference numerals.

DETAILED DESCRIPTION OF THE PREFERRED EMBODIMENTS

Preferred embodiments of the present invention will now be described with reference to the accompanying drawings.

The present invention provides a two-level structure together with processing methods that operate on the structure and input data to facilitate efficient multi-dimensional analysis of customer-oriented data sets. The upper level may be a multi-dimensional index, while the lower level may include summarized lists corresponding to the cells in the multi-dimensional space spanned by the index. In a preferred embodiment, the upper level is a search-tree structure in which the "keys" are the combinations of dimension elements corresponding to lists materialized in the lower level. However, other techniques for data indexing (including but not limited to multi-dimensional arrays, B-trees, R-trees, quad-trees, hashing-based structures, and so forth) may also be used. All of these techniques solve the same general problem—they map from "keys" to "data values." For example, in a standard B-tree or hashing-based structure over an employee record file, the "key" may be a social security number of an employee, while the "data" may be the record for the employee. In the present application, the "key" may be a combination of dimension elements, while the "data" may be the corresponding list.

As an example, consider a three-dimensional space or model in which the dimensions are product, store, and time. Furthermore, in this situation, assume that the product dimension includes the elements shoes, shirts, and ties, that the store dimension includes the elements east and west, and that the time dimension has the dates Jan. 1, 1996, Jan. 2, 1996, Jan. 3, 1996, and Jan. 4 1996. For ease of explanation, assume that there are no hierarchies on the dimensions.

In the above situation, there are 24 distinct cells representing all combinations of dimension elements (3 products* 2 stores* 4 dates). In addition, there may be a number of ce corresponding to "projecting out" one or more of the dimensions. For example, if time is omitted, product by store is obtained which is a sub-array of 6 cells; if store is omitted, product by date is obtained, which is a sub-array of 12 cells; if date and store are omitted, a three cell sub-array having one entry for each product is obtained; and so forth.

In each of these cells, a list of records corresponding to individual customer behavior in that cell may be stored. In these records, a customer or account identification (ID) or field may be provided, which can be any number that uniquely identifies a customer or account. Additionally, there may be a number of user-selected fields corresponding to information the user (or application developer) has deemed important. For example, if the selected additional fields are total dollars spent, number of purchases, and rank within the cell, the records in the lists will have the format customer ID, dollars spent, number of purchases, and rank.

Then, as an example, in a cell corresponding to (shoes, east, Jan. 1, 1996), a record would be stored for each customer who made at least one purchase of shoes in the east store on Jan. 1, 1996. This record would have each such customer's id, the dollars the customer(s) spent, and the number of purchases the customer(s) made on shoes in the east store on Jan. 1, 1996.

Figure 1:
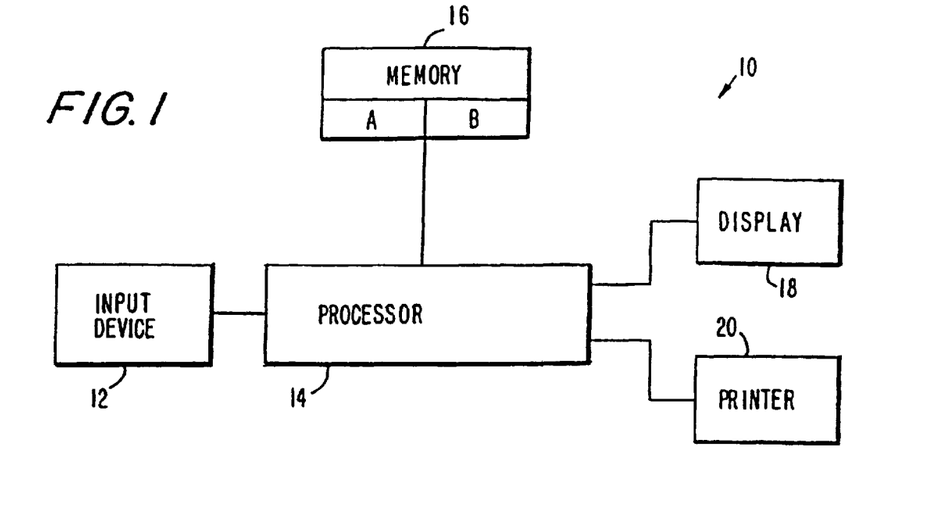
FIG. 1 is a diagram of an apparatus for storing, retrieving, and processing customer data, account data or the like according to an embodiment of the present invention.

An apparatus for storing, retrieving, and processing customer data, account data and so forth is illustrated in FIG. 1. As shown therein, such apparatus 10 may include an input device 12, a processor 14, a memory 16, a display unit 18, and a printer 20. The memory may include a number of portions or areas such as area A and area B. Each of such areas may include a respective type of memory or storage. For example, area A may be a semiconductor memory and area B may be a disc-type storage or memory.

With regard to the above-mentioned two types of storage, the disk storage (which may be referred to as an external memory) may have a relatively high storage capacity and may be relatively inexpensive. Although access to data stored in such disk storage may be relatively slow, access to such data may be improved if data is sequentially accessed as compared to randomly accessed. (In sequential accessing, consecutive accesses are to adjacent storage locations on the disk. In random accessing, consecutive accesses may be to locations scattered throughout the disk.) Further, the semiconductor memory (which may be referred to as a main memory) may be faster than the external memory. Although the semiconductor memory may have less capacity than the disk storage, the present invention efficiently utilizes both types of storage.

Input data (such as customer data, account data, and the like) or requests for desired information (such as user query) may be inputted to the input device 12 by an operator, whereupon a signal corresponding thereto may be generated and supplied to the processor 14. The processor 14 is adapted to process the received data and/or to provide the requested information. That is, the processor 14 may receive data and/or request from the input device 12 and previously stored instructions from the memory 16A and, in accordance therewith, may process the received data (for example, translate the user query to structured query language (SQL)), store the processed data in the memory 16B, and/or cause the request information to be displayed on the display unit 18 or printed by the printer 20 (for example, execute the translate user query in relational database system environment). Such operation of the processor 14 will be hereinafter more fully described.

Figure 2:
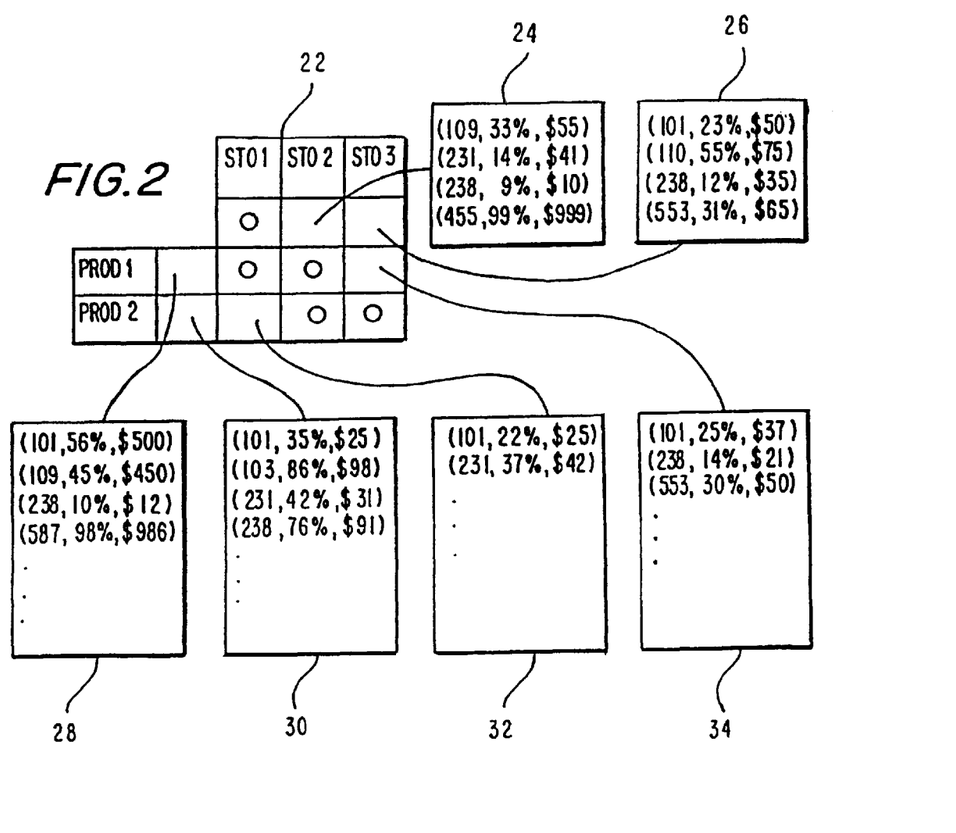
FIG. 2 illustrate diagrams to which reference will be made in explaining a list model.

22 illustrates a model representing two products and three stores, wherein information indicative of the amount each customer spent on each product and/or in each store may have been supplied to the processor 14 by way of the input device 12 so as to be processed and/or stored in the memory 16. Assume that an operator wishes to know the total amount each customer spent in each store, the total amount each customer spent on each product, and the total amount each customer spent on each product in each store. In this situation, the operator may input a command requesting such information by use of the input device 12. As a result, a corresponding request signal is supplied to the processor 14, whereupon the appropriate processing and/or retrieval of data is performed and the requested information is supplied to the display 18 so as to be displayed thereat and/or the printer 20 so as to obtain a printed copy of such information. Based upon the operator's request, eleven "lists" may be obtained. Six of such lists are illustrated 24–34 That is, lists for Sto2, for Sto3, Prod1, for Prod2, and for combinations (Prod2, Sto1) and (Prod1,Sto3) are respectively shown 24–34. For clarity, five of the lists have been omitted from the picture. The fields stored in the lists are ID, percentile within list, and dollar amount within list. So, for example, with respect to product 1 in store 3 as shown in the list for (Prod1, Sto3) 34, customer 101 is at the $25^{th}$ percentile and has made purchases totaling $37. Similarly, with respect to product 1 as shown in the list for Prod 128, customer 101 is in the $56^{th}$ percentile with purchases of $500.

The present invention enables efficient and intuitive multi-dimensional access to customer-level data. That is, one merely specifies the cell or set of cells of interest; by using the upper-level structure (the multi-dimensional index) one is directed to the appropriate list; and in the list, the information about all customer behavior relevant to that cell is immediately available by a simple scan of the list. The information in the list may be summarized by customer specifically for the cell in which it resides. Such arrangement is preferable, since any more highly summarized information may result in information being discarded or lost, while any less highly summarized information may increase the data size and slow retrieval and subsequent processing. Furthermore, since the list may only contain records of customers who actually made purchases in the cell in question, the number of entries in such a list may be substantially less than and, in fact, may be orders of magnitude less than the number of customers and transactions in the total data set. Thus, a query on a specific cell may examine a relatively small set or the minimal set of data necessary to answer the query.

To effectively utilize the storage structure or capability, the present invention enables the lists for populating the cells of the multi-dimensional space to be efficiently generated from input data and enables operations to be performed on existing lists to generate new ones in response to user queries. The ability to efficiently generate the lists is useful because lists may be generated in a number of situations during the operation of the present invention. First, lists may be generated to initially populate the database. Second, as mentioned previously, in large multi-dimensional models it may be unfeasible to populate all cells of the multi-dimensional space. In such situations, a preferred procedure may be to initially populate a subset of the cells and to generate lists for other cells on an "as needed" basis. Third, during a user analysis session or the like, users may ask queries which require existing lists to be combined so as to generate a new list that constitutes the answer to the query.

In customer information database applications, the initial data set may come from a number of sources, including "operational data" which pertains to the customer's transactions, and demographic data which may describe demographic information pertaining to the customers which may not be related to their transactions. For example, the operational data may include a large transaction file containing information for each transaction by each customer, and the demographic data may be obtained from information provided by the customers (such as when their accounts were initially established) and/or may be purchased from a third-party provider.

Prior to generating the lists for populating the multi-dimensional space, the customer or account numbers should be standardized and assigned for all sources of information such that each customer or account has a unique identifier. Thereafter, the input files are to be sorted based upon this identifier, such as standardized customer/account number(s). The order established in this sort is preferably maintained throughout the operation of the present invention. Such order may allow operations to be performed efficiently which may otherwise result in more lengthy computation and/or need more computer memory.

To see how the above-mentioned order is utilized in the present invention, data pertaining to records in the lists may be arranged into two user-specified fields, that is, an intra-customer field and an inter-customer field. An intra-customer field(s) may be computed for a respective customer by examining base-level records of that customer in isolation. For example, to count the number of purchases made by such respective customer in a particular store, only the records for that customer are examined. In this example, the behavior or records of other customers are irrelevant. On the other hand, inter-customer fields may utilize information from a number of intra-customer fields of other customers in the cell. For example, consider the situation wherein it is desired to store or obtain a field having the rank of customer in a given cell with regard to a predetermined criteria, such as the ranking with regard to total purchases made. (In this situation, a rank of 1 may indicate the customer having made the most purchases, a rank of 2 may indicate the customer having made the second most purchases, and so forth.) As is to be appreciated, in this situation, purchases of other customers in that cell are utilized or examined to determine the rank of the desired customer.

The present invention provides an efficient mechanism for computing both types of fields (that is, intra-fields and inter-fields). As an example, consider the situation wherein one relatively large input file of customer transactions exists in which each record in this file contains the customer's account number, the store ID for the store in which the purchase was made, the product that was purchased, the date upon which the purchase was made, and the dollar amount for the transaction. Suppose, in this situation, that the list for the "shoes" cell is desired wherein the records in this list have fields for the customer ID, total sales, and rank. As a result, a record may be obtained for a customer (such as customer #270,567) having the total purchase amount for all shoes bought by customer #270,567, and the rank of this customer (which indicates whether this customer purchased the most shoes, the second most, and so forth).

The cell list for "shoes" may be generated in a single pass over the input transaction file, which has been sorted by customer ID. As each new customer's records are encountered (all such records are adjacent), the apparatus 10 extracts records which pertain to the purchases of shoes. The apparatus 10 may sum the purchases or sales for such records, and retain or store the record for this customer in the list for the "shoes" cell in the memory 16. If other intra-customer fields have been specified or requested for this list, they may be computed or obtained in the same pass. At this point, all inter-customer fields may be blank. Upon completing the scan of the input transaction file, the entire list for the "shoes" cell may be computed or obtained such that the intra-customer fields may be correctly computed and the inter-customer fields may be empty or blank.

Therefore, the above-described results pertaining to the cell list for "shoes" may be obtained with only a single pass of the transaction file. Further, the records of the list may be generated in the correct order without additional sorting. Furthermore, the capacity of the main memory may be such so as to hold the input transaction records of a single customer and the obtained record, and the reading and writing of data from/to the external memory may be performed in a "sequential" manner. As such, the main memory and external memory may be efficiently utilized.

Although in the above description a single list was obtained from a single pass of the input file, the present apparatus is not so limited. That is, the apparatus 10 may enable a plurality of lists to be computed or obtained for a plurality of cells from a single pass of the input file. At the end of this pass, the apparatus 10 may have computed lists for all cells such that the intra-customer fields have been filled in or computed and the inter-customer fields have been left empty or blank. In this situation, the capacity of the memory 16 is such so as to hold the input transaction file and customer records for each list to be generated.

The apparatus 10 may also handle or process multiple input data sources or files. That is, after the input files have been sorted in accordance with a predetermined sorting criteria (such as based on customer ID), the lists may be generated with a single, synchronized "merge" pass through the sorted input files. During this processing, the apparatus 10 may consider each account or customer number in turn while stepping through the input files. Since the input files are sorted, the information for computing the intra-customer records is available. Additionally, in this situation, the memory capacity for the memory 16 and the amount of computation performed by the processor 14 may be minimal or relatively small.

With regard to the inter-customer fields, the apparatus 10 may perform a second pass over the partially filled-in lists so as to compute or obtain the inter-field data. Since inter-customer fields in a given cell may depend only upon the intra-customer fields of the records in the cell, the apparatus 10 may be able to perform such processing without referring back to input data or to records in lists of other cells. Since the lists in the cells may be substantially smaller than the input data set, such procedure may be efficient. As an example of such inter-customer field processing, the "percentile" field within a cell (of the above-described example) may be computed by sorting the records in the list on sales.

Thus, to compute or obtain the initial lists for the cells, the apparatus 10 may utilize a two-phase (two-pass) procedure wherein the intra-customer fields may be computed during a first pass over the input data files and the inter-customer fields may be computed during a second pass over the partially filled-in lists. As previously described, such procedure results in an efficient use of computation and storage.

Figure 3:
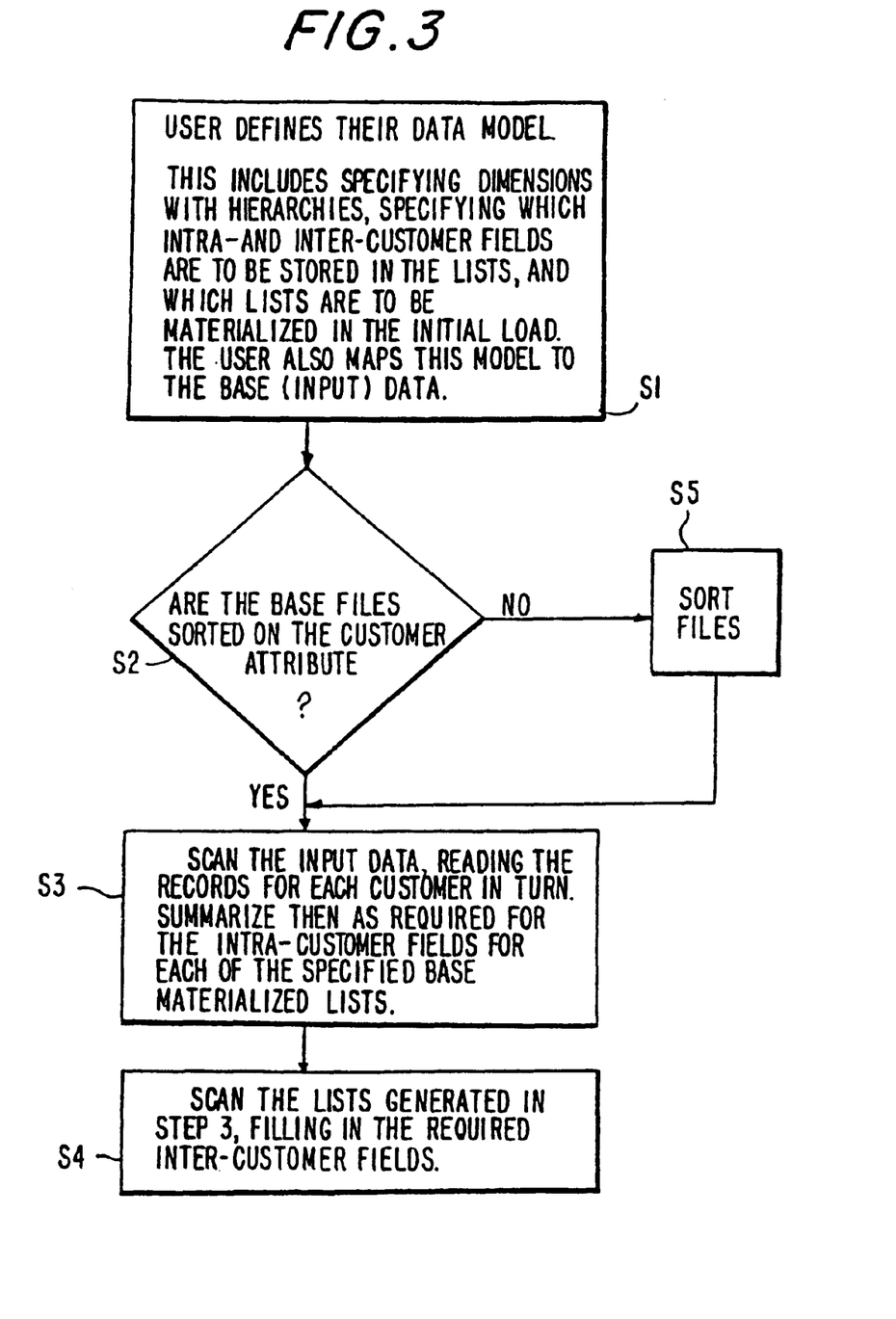
FIG. 3 is a flow chart to which reference will be made in explaining the loading of a list.

The above-described procedure for obtaining the initial list(s) is outlined in the flow chart of FIG. 3. As shown therein, processing may be initiated at step S1 wherein a user may define a model and supply the same to the apparatus 10. In defining the model, the user may indicate the dimensions with hierarchies, may specify the intra-and inter-customer fields which are to be stored in the lists, and may specify the lists which are to be initially obtained. At step S1, the user may also map the model to the base or input data.

Processing may then proceed to step S2 wherein a determination is made as to whether the base files have been sorted. If the determination in step S2 is negative, processing proceeds to step S5 wherein the files are sorted in a accordance with a predetermined or desired manner. Thereafter, processing proceeds to step S3. If, however, the determination in step S2 is affirmative, processing proceeds directly to step S3.

At step S3, the input data may be scanned wherein the information for each customer may be read and summarized for the intra-customer fields for the specified base lists. Thereafter, processing may proceed to step S4.

At step S4, the lists generated in step S3 may be scanned so as to obtain the inter-customer fields.

Next, a procedure for computing new lists from existing lists at query time will be described.

As previously indicated, if the number of cells in a multi-dimensional space is too large, one may choose not to store or materialize all of these cells. As an example, and with reference to the above-described example, one may choose to only materialize lists for purchases by store, purchases by product, and/or purchases by date. However, if only such lists are materialized, one may be unable to answer queries on cells having lists which have not been materialized. In other words, one may be unable to answer a question regarding a not-yet-computed cell which is higher in the hierarchical chain. For example, although one may be able to answer a question regarding purchases by store, one may be unable to answer a question regarding purchases by city in the above example.

The present apparatus may enable the above question regarding purchases by city to be answered by utilizing a hierarchical multi-dimensional model and by sorting the lists in the cells. More specifically, to compute the purchases by a city, the apparatus 10 may identify the cells corresponding to sales by store for each store within the city and then compute the intra-customer fields of the new list by performing a so-called synchronized merge-scan of the existing lists. That is, the apparatus 10 may maintain in the memory 16 the purchases of a customer in each store in the city. The apparatus may combine or merge these purchases so as to compute the purchases for the customer in the city and form that customer's "city" record. After this merge, the list for the city may be in the proper sorted order and may be complete except for the inter-customer fields. Such fields may be computed by a second scan of the new city list. As with populating the initial list, this processing utilizes a minimal or relatively small amount of computation processing and memory capacity or storage.

Figure 4:
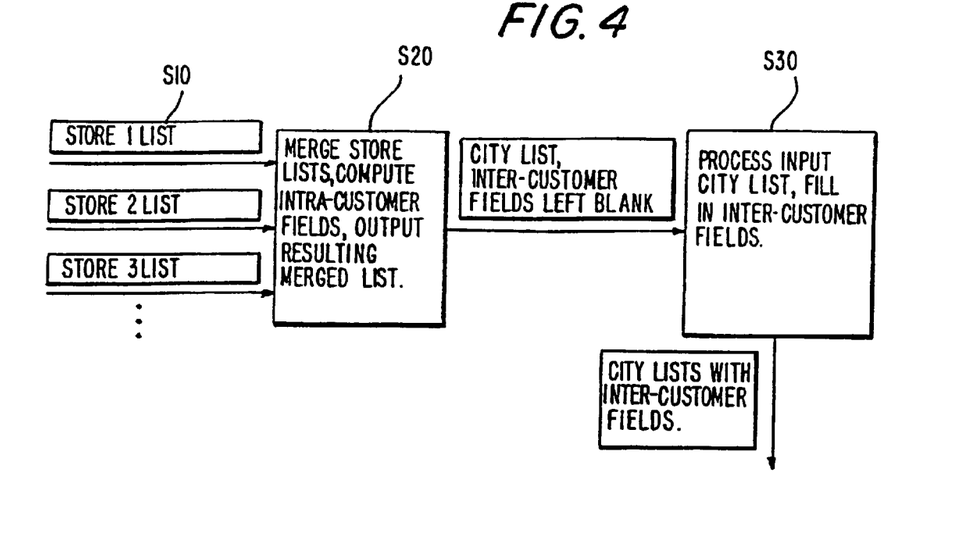
FIG. 4 is a diagram to which reference will be made in explaining the computing of a city list from a plurality of store lists.

The above-described procedure for obtaining purchases by city is outlined in the flow chart of FIG. 4. As shown therein, lists for stores in the city representing purchases made by customers may be obtained at step S10. Processing may then proceed to step S20 wherein such purchases may be combined or merged so as to compute the purchases for the customer(s) in the city or intra-customer fields. The resulting city list, which has the inter-customer fields blank, may be supplied to step S30 wherein the inter-customer fields may be computed. Thereafter, the city list having the inter-customer fields is available.

Figure 5:
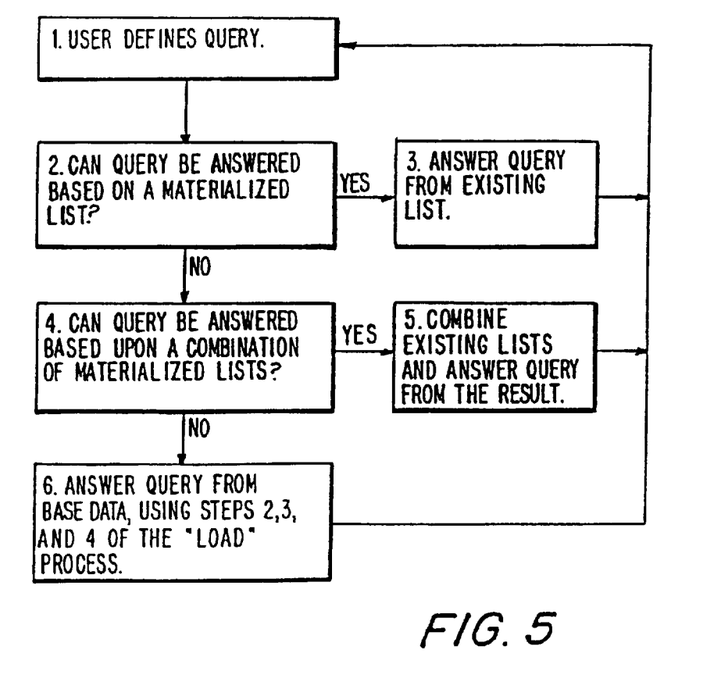
FIG. 5 is a flow chart illustrating the steps performed in processing queries.

Further, during a query session, the present apparatus enables lists to be materialized which may not be part of the multi-dimensional space. As an example, the apparatus 10 enables a list to be materialized for all customers who have spent more than $20 on socks and have not yet purchased shoes. To perform such operation, the apparatus 10 performs a synchronized "merge" pass through the list for socks and the list for shoes. That is, as each customer in the sock list is encountered, the apparatus 10 may determine if the sock purchase total exceeds $20, and if so, the apparatus 10 may further determine if the respective customer does not appear in the shoe list. If both determinations are found to be true, a record or indication of the respective customer may be added to the new list. Such procedure is continued until reaching the end of the sock list. Thus, this procedure may be performed with only a single scan of both the socks and shoes lists, and the number of comparisons made during the determinations is linear or proportional to the number of records in these lists. Such procedure enables an optimal use of computer hardware. The steps which may be performed by the apparatus 10 in processing queries is illustrated in the flow chart shown in FIG. 5.

Accordingly, the present apparatus may facilitate a query which involves a Boolean (and, or, and-not) combination of lists, along with filters on the inter-customer and intra-customer fields in these lists. These filters may be comparators or predicatives on the field(s) of the records in the lists. For example, in determining purchases greater than $20.00 a filter or comparator may be used. Such query may be answered by performing a linear scan of the appropriate lists and performing computations (such as comparison computations) which are linear or proportional in number to the records in the lists such that a relatively small or minimal amount of memory (for example, enough to hold the transactions of a single customer) is utilized.

Figure 6:
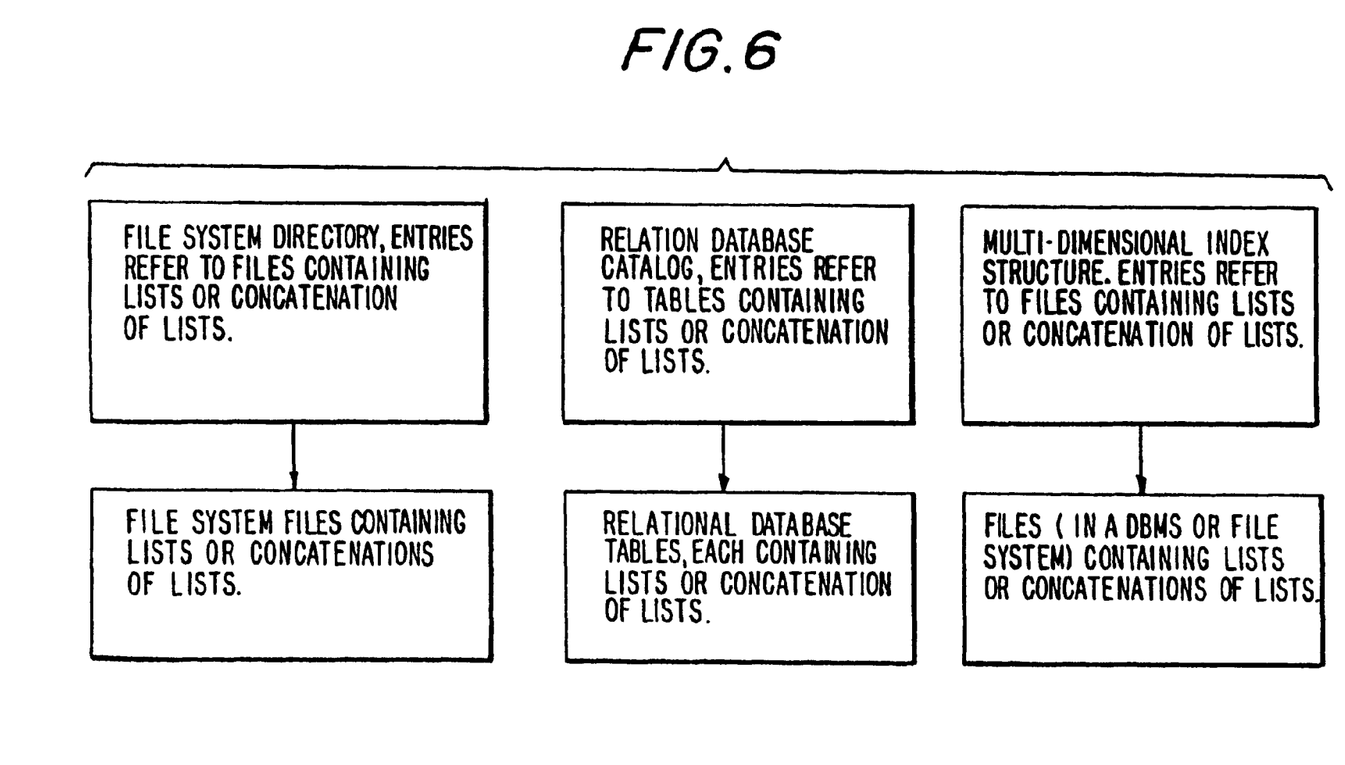
FIG. 6 is a diagram illustrating alternative ways in which the present invention may be incorporated.

FIG. 6 illustrates a number of ways in which the present invention may be incorporated. However, the present invention is not limited to these ways and may be incorporated in a number of other ways.

Thus, the present invention enables data to be retrieved and/or processed in a relatively high efficient manner. Additionally, by storing and processing data in a multi-dimensional arrangement, the present invention facilitates the use thereof by an operator.

The present invention may be embodied in a number of different ways, each of which may involve a program and structures stored in computer memory and procedures for operating on these structures. The present invention is preferably implemented using software and an apparatus having a memory and a processor (such as the apparatus 10). However, the present invention could also be implemented utilizing hardware.

Further, in addition to the arrangement described above, a number of alternatives for the upper-level index and the lower-level lists may be utilized. For example, the upper-level index could be embodied by a search-tree structure, in which the "keys" (corresponding to cells populated with dimension elements) are names of the lists (such as a table name, a file name, etc.) in the multi-dimensional space. Such search-tree structure may be a B-tree, the directory structure employed by a computer operating system in its file management structure, or a system catalog of a relational database system. The lower-level lists may be stored in the files of an operating system. Alternatively, such lists may be stored as tables in a relational database system, where each table may correspond to one or a combination of "keys" of the upper-level index structure. This latter technique may be preferable for the situation wherein relational database system catalogs are used to store the multi-dimensional index.

Furthermore, although the present invention was primarily described with reference to "customers", the present invention is not so limited. That is, the present invention may be applied to other data items which may have a large number of entries such as accounts, so-called register ring numbers, or the like.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A method for obtaining desired information from data representative of a number of data items, comprising the steps of:

storing in a first memory portion of a computer memory a plurality of cells being represented as a multi-dimensional storage structure that is defined by a plurality of dimensions, wherein each of said dimensions includes a plurality of members for identifying said desired information, each of said cells corresponding to at least one of said members;

storing in a second memory portion of said computer memory a plurality of data lists, each of said data lists comprising a plurality of records for storing said desired information;

linking each said cell with a respective data list such that each respective cell represents a multi-dimensional index to the corresponding data list, whereby each said data list is identified by said at least one of said members; and wherein each said data item corresponds to a customer such that said desired information selectively represents at least one transaction carried out by said customer or demographic data about said customer, said one transaction or demographic data being selectively defined by said at least one of said members.

2. The method according to claim 1, further comprising selectively storing in each of said records a first field corresponding to intra-data item summary information which is obtained by processing said desired information for the corresponding data item without referring to other data items in a respective data list, and selectively storing in each said record a second field corresponding to inter-data item summary information which is obtained by processing said desired information for the corresponding data item by referring to said other data items in said respective data list.

3. The method according to claim 1, wherein each said cell is linked with the corresponding data list via a pointer.

4. The method according to claim 3, wherein said plurality of cells in said first memory portion is arranged as a file system directory, each said cell being represented by a file name, each said data list in said second memory portion being represented by a file, said pointer being said file name.

5. The method according to claim 3, wherein said plurality of cells in said first memory portion is arranged as a relational database, at least one of said cells being represented by a table name, each said data list in said second memory portion being represented by a table, and said pointer being represented by said table name.

6. The method according to claim 3, wherein said plurality of cells in said first memory portion is arranged as one of a B-tree, a quad-tree, an R-tree, and an array, wherein each said data list is represented by a file.

7. The method according to claim 1, wherein said respective data list is identified by a combination of said members from different dimensions.

8. A method for generating a plurality of data lists in a multi-dimensional storage structure for storing desired information obtained from data representative of data items, said desired information having been stored in a first memory portion of a computer memory as a plurality of cells being represented as said multi-dimensional storage structure that is defined by a plurality of dimensions, wherein each of said dimensions includes a plurality of members for identifying said desired information, each of said cells corresponding to at least one of said members, said desired information having been further stored in a second memory portion of said computer memory as a plurality of data lists, each of said data lists comprising a plurality of records for storing said desired information and an identifier for each said data item, said method comprising the steps of:

sorting said data by using said identifier;

extracting from the sorted data intra-data item summary information which is obtained by processing said desired information for each corresponding data item without referring to other data items in a respective data list;

supplying the extracted intra-data item summary information to respective records in each said data list;

accessing each said data list for determining inter-data item summary information which is obtained by processing the extracted intra-data item summary information for the corresponding data item by referring to said other data items in said respective data list;

supplying said inter-data item summary information to said respective records;

linking each said cell with said respective data list such that each said cell represents a multi-dimensional index to each said data list, whereby each said data list is identified by said at least one of said members; and wherein each said data item corresponds to a customer such that said data selectively represents at least one said transaction carried out by said customer, said one transaction or demographic data being selectively defined by said at least one of said members.

9. The method according to claim 8, wherein said respective data list is identified by a combination of said members from different dimensions.

10. The method according to claim 8, further comprising generating said data lists for a subset of said cells.

11. The method according to claim 10, further comprising performing Boolean operations on said data lists to generate a new list corresponding to a respective cell.

12. The method according to claim 11, wherein said dimensions are represented by a plurality of hierarchical orders, said new list being higher in a hierarchical order corresponding to a preselected dimension than the previously generated data lists corresponding to said preselected dimension.

13. The method according to claim 8, further comprising filtering said respective records in said data lists to generate a new list which does not correspond to any one of said cells.

14. An apparatus for obtaining desired information from data representative of a number of data items, comprising:

means for storing in a first memory portion of a computer memory a plurality of cells being represented as a multi-dimensional storage structure that is defined by a plurality of dimensions, wherein each of said dimensions includes a plurality of members for identifying said desired information, each of said cells corresponding to at least one of said members;

means for storing in a second memory portion of said computer memory a plurality of data lists, each of said data lists comprising a plurality of records for storing said desired information;

means for linking each said cell with a respective data list such that each respective cell represents a multi-dimensional index to the corresponding data list, whereby each said data list is identified by said at least one of said members; and wherein each said data item corresponds to a customer such that said data selectively represents at least one transaction carried out by said customer or demographic data about said customer, said one transaction or demographic data being selectively defined by said at least one of said members.

15. The apparatus according to claim 14, further comprising means for selectively storing in each of said records a first field corresponding to intra-data item summary information which is obtained by processing said desired information for each corresponding data item without referring to other data items in said respective data list, and means for selectively storing in each said record a second field corresponding to inter-data item summary information which is obtained by processing said desired information for the corresponding data item by referring to said other data items in said respective data list.

16. The apparatus according to claim 14, wherein each said cell is linked with the corresponding data list via a pointer.

17. The apparatus according to claim 16, wherein said plurality of cells in said first memory portion is arranged as a file system directory, each said cell being represented by a file name, each said data list in said second memory portion being represented by a file, and said pointer being said file name.

18. The apparatus according to claim 16, wherein said plurality of cells in said first memory portion is arranged as a relational database, at least one of said cells being represented by a table name, each said data list in said second memory portion being represented by a table, said pointer being represented by said table name.

19. The apparatus according to claim 16, wherein said plurality of cells in said first memory portion is arranged as one of a B-tree, a quad-tree, an R-tree, and an array, each said data list being represented by a file.

20. The apparatus according to claim 14, wherein said respective data list is identified by a combination of said members from different dimensions.

21. An apparatus for generating, in response to a user query, at least one data list in a multi-dimensional storage structure for storing desired information obtained from data representative of data items, said desired information being stored in a first memory portion of a computer memory as a plurality of cells being represented as said multi-dimensional storage structure that is defined by a plurality of dimensions, wherein each of said dimensions includes a plurality of members for identifying said desired information, each of said cells corresponding to at least one of said members, said desired information being further stored in a second memory portion of said computer memory as a plurality of data lists, each of said data lists comprising a plurality of records for storing said desired information and an identifier for each said data item, said apparatus comprising:

means for sorting said data by using said identifier;

means for extracting from the sorted data intra-data item summary information which is obtained by processing said desired information for each corresponding data item without referring to other data items in a respective data list;

means for supplying the extracted intra-data item summary information to respective records in each said list;

means for supplying the extracted intra-data item summary to respective records in each said data list;

means for accessing each said data list for determining inter-data item summary information which is obtained by processing the extracted intra-data item summary information for the corresponding data item by referring to said other data items in said respective data list;

means for supplying said inter-data item summary information to said respective records;

means for linking each said cell with said respective data list such that each said cell represents a multi-dimensional index to the corresponding data list whereby each said data list is identified by said at least one of said members;

means for outputting said data lists, and wherein each said data item corresponds to a customer such that said data selectively represents at least one transaction carried out by said customer or demographic data about said customer, said one transaction or demographic data being selectively defined by said at least one of said members.

22. The apparatus according to claim 21, wherein said respective data list is identified by a combination of said members from different dimensions.

23. The apparatus according to claim 21, further comprising means for generating said data lists for a subset of said cells.

24. The apparatus according to claim 23, further comprising means for performing Boolean operations on said data lists to generate a new data list corresponding to a respective cell.

25. The apparatus according to claim 24, wherein said dimensions are represented by a plurality of hierarchical orders, said new data list being higher in a hierarchical order corresponding to a preselected dimension than the previously generated data lists corresponding to said preselected dimension.

26. The apparatus according to claim 21, further comprising means for filtering said respective records in said data lists to generate a new data list which does not correspond to any one of said cells.

27. The apparatus according to claim 21, wherein said means for outputting is one of a display device and a printer.

28. The apparatus according to claim 21, further comprising means for translating said user query to structured query language (SQL) and means for executing the translated user query in relational database system environment.

29. An apparatus for generating, in response to a user query, at least one data list in a multi-dimensional storage structure for storing desired information obtained from data representative of data items, said apparatus comprising:

means for storing said desired information as a plurality of cells being represented as said multi-dimensional storage structure that is defined by a plurality of dimensions, wherein each of said dimensions includes a plurality of members for identifying said desired information, each of said cells corresponding to at least one of said members;

means for further storing said desired information as a plurality of data lists, each of said data lists comprising a plurality of records for storing said desired information and an identifier for each said data item;

means for sorting said data by using said identifier;

means for extracting from the sorted data intra-data item summary information which is obtained by processing said desired information for each corresponding data item without referring to other data items in a respective data list;

means for supplying the extracted intra-data item summary information to respective records in each said data list;

means for accessing each said data list for determining inter-data item summary information which is obtained by processing the extracted intra-data item summary information for the corresponding data item by referring to said other data items in said respective data list;

means for supplying said inter-data item summary information to said respective records;

means for linking each said cell with said respective data list such that each said cell represents a multi-dimensional index to the corresponding data list, whereby each said data list is identified by said at least one of said members; and means for outputting said data lists.

30. A method for generating, in response to a user query, at least one data list in a multi-dimensional storage structure for storing desired information obtained from data representative of data items, said method comprising the steps of:

storing said desired information as a plurality of cells being represented as said multi-dimensional storage structure that is defined by a plurality of dimensions, wherein each of said dimensions includes a plurality of members for identifying said desired information, each of said cells corresponding to at least one of said members;

storing said desired information as a plurality of data lists, each of said data lists comprising a plurality of records for storing said desired information and an identifier for each said data item;

sorting said data by using said identifier;

extracting from the sorted data intra-data item summary information which is obtained by processing said desired information for each corresponding data item without referring to other data items in a respective data list;

supplying the extracted intra-data item summary information to respective records in each said data list;

accessing each said data list for determining inter-data item summary information which is obtained by processing the extracted intra-data item summary information for the corresponding data item by referring to said other data items in said respective data list;

supplying said inter-data item summary information to said respective records;

linking each said cell with said respective data list such that each said cell represents a multi-dimensional index to the corresponding data list, whereby each said data list is identified by said at least one of said members; and outputting said data lists.

\* \* \* \* \*